May 26, 1931. C. B. KELLER 1,807,293
JEWELRY FASTENER
Filed Oct. 23, 1929
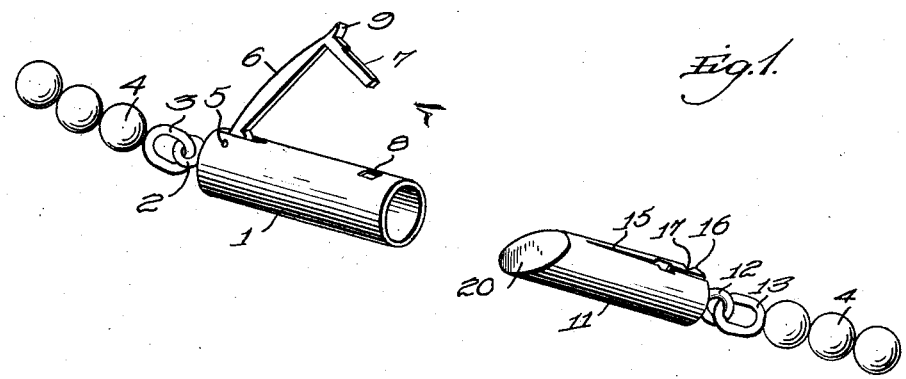
Fig. 1.
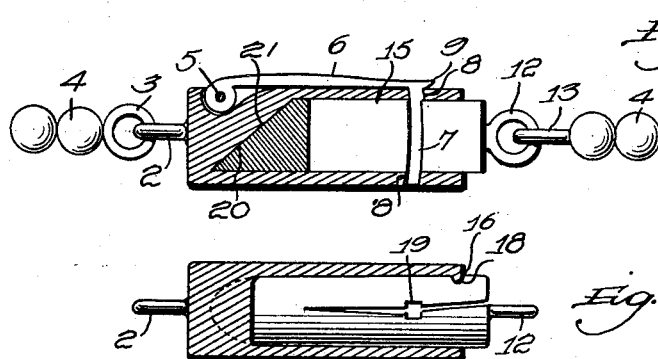
Fig. 2.
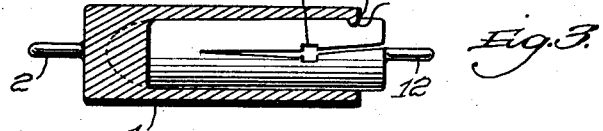
Fig. 3.
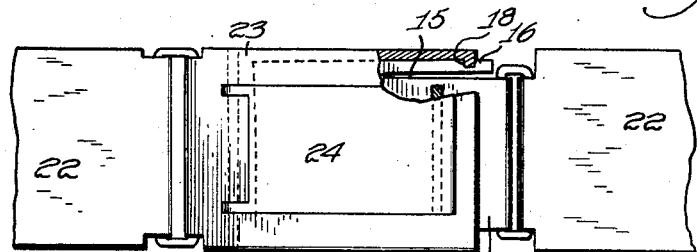
Fig. 4.
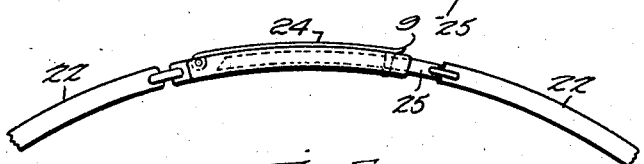
Fig. 5.
Inventor
CHARLES B. KELLER
By 
Attorney Patented May 26, 1931

1,807,293

UNITED STATES PATENT OFFICE

CHARLES BERNARD KELLER, OF WILLOW GROVE, PENNSYLVANIA

JEWELRY FASTENER

Application filed October 23, 1929. Serial No. 401,764.

My invention relates to improvements in jewelry fasteners or clasps, which are particularly designed and adapted for connecting the ends of necklaces, bracelets, chains and other articles of like character, although the structure might be adapted for use as a lock or guard to prevent an article of jewelry being stolen or becoming accidentally released.

One object of my invention is the provision of a fastening or clasp of the character described which will provide in addition and in conjunction with the usual fastening means, a separate locking means which will thus provide an absolutely reliable fastening and locking means to positively secure the parts and guard against accidental unfastening or theft.

Another object of the invention is the provision of a fastening and locking means which will render rapid and easy the securing of the parts in locked relation, but which will permit ready and quick release of the parts when desired.

Another object of my invention is the provision of a fastener of the character and for the purposes stated which will be small and compact in size to adapt it to the various uses and which will be of extremely ornamental and attractive appearance.

Another object of my invention is the provision of a fastener which will be of simple, strong and durable construction, inexpensive of production and thoroughly efficient and practical in every particular.

With these objects in view my invention consists of a jewelry fastener or clasp embodying in combination a latching means between its male and female members and an additional locking means for securing said members in closed relation.

The invention further consists of a jewelry fastener embodying novel features of construction and combination of parts, substantially as described and claimed and as shown in the accompanying drawings, in which:

Figure 1 represents a perspective view of the complete fastener, the parts being shown in the position they occupy before the parts are secured in locked position.

Figure 2 represents a vertical central sectional view of the fastener with the parts in locked relation.

Figure 3 represents a horizontal sectional view of the fastener with the parts or members in locked relation.

Figure 4 represents a top plan view of a modified form of the fastener such as used upon a flat bracelet, and Figure 5 represents a side elevation or edge view of the flat bracelet construction.

My invention is of the most simple construction and in the construction shown in Figures 1, 2 and 3, the fastener comprises the tubular female member 1, which at its outer end carries an eye 2, for connection with the link 3, upon a string of beads 4, or other article, and said female member has pivoted near its outer end at 5, the arm 6 which carries the locking portion or keeper 7, which when the parts are in locked position is adapted to pass through the pair of openings 8, and this locking member is also provided with the finger piece 9, which allows the pivoted locking member to be easily lifted when necessary to release said locking member.

The construction described is of the female member of my fastener and the male member which is adapted to fit the female member consists of the tubular body 11, of a size to snugly fit the female member and having at its outer end an eye 12, to receive the link 13, on the other end of the necklace 14, and said male member is slitted at 15, to provide the spring latch 16, formed with the recess 17, to be engaged by the lug 18, of the female member, for securing the parts in latched relation, as shown in Figures 2 and 3, while the recesses or channels 19 are provided in the male member which register with the openings 8, of the female member, in order when the male member is placed in the female member the keeper 7 will pass through said openings 8 and the recesses or channels 19 and lock the male and female members in position, thus forming in addition to the spring latch a positive locking means, and to insure the male member centering right in the female member, said male member is formed with an inclined inner end 20 which co-acts with an inclined portion 21 of the female member.

In the form of my invention shown in Figures 4 and 5 the structure is particularly adapted for use with flat curved bracelets 22, and consists of the curved flat female member 23, which carries the hinged locking element 24, which locks the flat male member 25, the same as in the other form of my invention and the construction being identical in all respects, except that the inclined meeting edges are not employed in the flat form of my invention.

The operation of my invention will be obvious from the description and drawings and it will be noted that the locking element is raised and the male member is moved into the female member and the latch is brought into register by the meeting of the inclined walls of the male and female members and in this position the openings of the female member are in register with the channels of the male member, and the locking element is then moved into the position shown in Figures 2 and 3 and the members are latched and locked in position, and to detach the members it is only necessary to lift the locking member and release the spring latch and the members can be instantly separated.

It will be noted that the fastener provides a latch and lock which is positive and reliable; that the article is of very ornamental and attractive appearance; that it is easy and quick in operation and absolutely certain; that the fastener is simple, cheap and durable and of small and compact size to render its use very desirable.

It will be noted that the inclined wall of the female member co-acts with the inclined face on the inner end of the male member which gives a turn or twist to the male member and causes the openings of the female member and the male member to align and that the keeper on the latch forms a perfect lock and is slightly curved which allows a wedging action to secure the members from movement and this is a most important feature of my invention.

I claim:

1. A fastener of the character described, consisting of a male and female member, latching means carried by said members, and a separate locking means connected to one of the members for additionally securing said male and female members together, said male member having a split in its forward end to form a spring tongue to engage and lock in said female member, and having notches formed in the opposite edges of said split to form a slot to receive said locking means, said female member having an opening, said locking means passing through said slot and opening to provide locking engagement with said members.

2. A fastener of the character described, consisting of male and female members and a hinged locking means carried by one member and engaging the other to lock the members together, said male member having a split in its forward end to form a spring tongue to engage and lock in said female member, and having notches formed in the opposite edges of said split to form a slot to receive said locking means, said female member having an opening, said locking means passing through said slot and opening to provide locking engagement with said members.

3. A fastener of the character described, consisting of a female member having a pair of registering openings in its walls, a hinged locking element carried by said female member and adapted to engage said openings, a male member adapted to fit within the female member and having a spring catch to engage said female member and also having recesses to register with the openings of said female member to be engaged by said locking element to secure the said members in locked relation, said male and female members being of cylindrical form, whereby when the male member is placed in the female member, a twist can be given to said male member to cause register of the recesses and openings in the male and female member so as to receive said locking element to lock the members together.

4. A fastener of the character described, consisting of a female member having an interior inclined wall, a male member having an exterior similar coacting inclined wall, said members having openings which register when said members are fitted together, and a locking element carried by one of said members to engage with said openings of said members to lock them together, said male and female members being of cylindrical form whereby upon insertion of the male member into the female member by reason of engagement of the inclined walls of said members, said male member will turn to bring the openings of both members into register.

In testimony whereof I affix my signature.

CHARLES BERNARD KELLER.